United States Patent [19]
Arikawa et al.

[11] 3,875,363

[45] Apr. 1, 1975

[54] COMPOSITE ELECTRODE WIRE FOR ELECTRO-SLAG WELDING

[75] Inventors: Masayasu Arikawa, Fujisawa; Toshihiko Watanabe, Kamakura; Motomi Kano, Fujisawa, all of Japan

[73] Assignee: Kobe Steel, Ltd., Fukiai-ku, Kobe, Japan

[22] Filed: May 14, 1973

[21] Appl. No.: 359,662

Related U.S. Application Data

[62] Division of Ser. No. 235,860, March 17, 1972, abandoned.

[30] Foreign Application Priority Data

Mar. 29, 1971 Japan.............................. 46-18642

[52] U.S. Cl..................... 219/73, 219/137, 219/146
[51] Int. Cl............................................ B23k 25/00
[58] Field of Search .......... 219/146, 145, 137, 126, 219/73; 117/202–207; 148/24, 26

[56] References Cited
UNITED STATES PATENTS 3,342,974  9/1967  Wallner .............................. 219/146

3,745,294  7/1973  Arikawa et al. ....................... 219/73

FOREIGN PATENTS OR APPLICATIONS 1,076,905  7/1967  United Kingdom ............... 219/146

*Primary Examiner*—J. V. Truhe
*Assistant Examiner*—Clifford C. Shaw
*Attorney, Agent, or Firm*—Oblon, Fisher, Spivak, McClelland & Maier

[57] ABSTRACT

A composite electrode wire for electro-slag welding, comprising a hollow casing of hoop steel and a powdery composition filled in said hollow casing, said wire containing 0.25 percent or less carbon, 0.3 to 2.5 percent manganese, 1 percent or less silicon and 0.001 to 0.05 percent boron with respect to the total weight of said wire, the boron content being present in the casing hollow in the form of a powdery boron alloy containing 50 percent or less boron. When mild steels or low alloy steels are welded by electro-slag welding by the use of the composite electrode wire, the crystal grains of deposited metal are made fine and spheroidal, enabling excellent welding which is high in notch toughness and which undergoes no internal cracking.

8 Claims, No Drawings

COMPOSITE ELECTRODE WIRE FOR ELECTRO-SLAG WELDING

This is a division of application Ser. No. 235,860, filed Mar. 17, 1972, now abandoned.

BACKGROUND OF THE INVENTION

1. Field Of The Invention

This invention relates to composite electrode wires for use in electro-slag welding (including consumable electro-slag welding) of mild steels and high tensile steels ranging from 50 kg/mm$^2$ class to 70 kg/mm$^2$ class low alloy steels.

2. Description Of Prior Art

Currently, electro-slag welding is being extensively employed in automatic vertical welding of mild steels and 50 to 70 kg/mm$^2$ class high tensile steels. As the application range becomes broader, however, a need has developed for an electrode wire for electro-slag welding, which will enable the formation of a weld metal having excellent physical properties, particularly with respect to notch toughness.

Presently, when comparatively thin steel plates (thickness of 50 mm. or less) are welded by electro-slag welding techniques, they are used as welded, without being subjected to any treatment for enhancing toughness, such as heat treatment. In thin welding, however, a large quantity of weld metal is produced in a single layer, and hence, the crystalline structure becomes coarse. The coarse structure of the weld metal adversely affects the mechanical properties of the weld, particularly its notch toughness, and, for example, can result in impact values at 0°C. of 1 to 2 kg.-m. As a result of extensive efforts to improve the impact value, it has now become possible to obtain relatively high impact values of 5 to 10 kg.-m. when welding the aforementioned comparatively thin plates. Thus, the range of application of electro-slag welding has been extended.

However, electro-slag welding is now chiefly employed where the base metal is a mild steel or 50-kg/mm$^2$ class conventional high tensile steel. If the metal composition contains large quantities of vanadium, niobium, phosphorus, sulfur, carbon, nitrogen or copper, however, the impact value of the weld is still low, so that electro-slag welding cannot be used for such base metals. If electro-slag welding is used for such base metals, it is necessary to enhance the impact value by the use of normalizing etc. after-welding.

In electro-slag welding, the weld metal is made 60% of the filler metal and 40% of the base metal in the fusion of both, which is an extremely high dilution of base metal as compared to other welding methods. Therefore, elements which would tend to extensively degrade the notch toughness of the weld metal, are inevitably introduced to the weld metal from the base metal. Also, compared with other welding methods, the growth of the crystal grains of the weld metal is extremely great, and in such giant sized crystal grains, the presence of the aforementioned elements, even in very slight quantities, have extremely adverse effects on the impact value of the weld metal. This tendency is particularly pronounced in the case of steels containing niobium.

Use of electro-slag welding is therefore limited to base metals having particular ranges of compositions in which the notch toughness of the weld will not be degraded. As has been mentioned, many unsolved problems still remain in connection with the degradation of the impact value of the weld metal produced in conventional electro-slag welding.

As an expedient measure, to avoid the above discussed difficulties, it has been proposed to add such elements as molybdenum, titanium, aluminum, zirconium, vanadium, niobium or tungsten to the deposited metal. Where the base metal contains large quantities of vanadium, niobium, phosphorus, sulfur, carbon, copper or nitrogen, however, the addition of the aforementioned elements only effects limited improvement in the notch toughness of the deposit, or in some cases may even adversely affect the notch toughness. The failure of this expedient to attain favorable results is attributable to the fact that compared to other welding processes, electro-slag welding is performed under extreme heat, and is mostly single layer automatic welding. In hand welding and in carbon dioxide gas arc welding, for instance, the heat supplied is 50,000 joules/cm. maximum, and in submerged arc welding, the heat supplied is 100,000 joules/cm. maximum. These relatively low heat values can be compared to electro-slag welding which requires 200,000 to 1,000,000 joules/cm., and thus, is extremely high in heat generation. Moreover, whereas other welding methods are multipass welding techniques, electro-slag welding is mostly single layer welding. Thus, the refinement of particle size due to the thermal influence of the individual passes cannot be expected, and a complete cast structure will result in a coarse crystalline structure.

Whereas in other welding methods, the filler metal and base metal are exposed once to a high temperature arc atmosphere, electro-slag welding proceeds not by an arc but through the joule heat provided by the current flowing through the slag. Therefore, the temperature of the weld metal zone is 1,700° to 2,000°C. maximum, and sufficient chemical and metallurgical reactions between the slag and metal cannot be expected. Also, the crystal grains of the deposited metal tend to be coarser. For the above reasons, vanadium, niobium, phosphorus, sulfur, carbon, copper and nitrogen in the base metal tend to segregate on the crystal grain boundaries. Since the segregation is very pronounced, the grain boundaries are rendered fragile so that the above-mentioned elements will have an extremely adverse effect on the notch toughness of the deposited metal, as compared to other welding methods. In some cases, the addition of these elements results in fragile grain boundaries because of the segregation thereon, thus degrading the notch toughness of the deposited metal.

SUMMARY OF THE INVENTION

Accordingly, a principal object of this invention is therefore to provide a composite electrode wire for improved electro-slag welding, which is free from the disadvantages of conventional electro-slag welding, high in the notch toughness of deposited metal and relatively free of internal cracking.

Another object of this invention is to extend the range of applicability of electro-slag welding from mild steels and low alloy steels up to the 70-kg/mm$^2$ class, within which degradation of the notch toughness has heretofore been unavoidable using conventional electro-slag welding processes.

Still another object of this invention is to provide an electrode wire for electro-slag welding, wherein the wire is remarkably effective in enhancing toughness even for niobium-containing steels in which degradation in the notch toughness of deposited metal has heretofore been conspicuous.

These and other objects of this invention will be more fully understood and appreciated after reviewing the following specification.

A characterizing feature of this invention resides in a composite electrode wire for electro-slag welding consisting of a powdery composition filled in a hollow hoop steel casing, which contains 0.25 percent or less carbon, 0.3 to 2.5 percent manganese, 1 percent or less silicon, and 0.001 to 0.05 percent boron with respect to the total weight of the composite wire, said boron content being present within said casing in the form of a powdery alloy containing 50% or less boron. The wire according to the invention may, if necessary, contain 0.1 to 1 percent molybdenum, 5 percent or less nickel, 5 percent or less chromium, and 1 percent or less of at least one member of the group consisting of aluminum, zirconium, titanium and vanadium.

DETAILED DESCRIPTION OF THE INVENTION

The invention is based on the findings obtained after various experiments, that in order to improve the notch toughness of the deposited metal in electro-slag welding, it is necessary to have fine round crystal grains. To obtain this result, it is necessary that the deposited metal contain suitable quantities of manganese and silicon and a slight quantity of boron. The boron content should be microscopically, uniformly, distributed in the deposited metal. Further, to prevent internal cracks within the deposited metal, and to obtain a sufficient impact value for the deposited metal, the boron added should be present in a particular form. The desirable effects of boron on the notch toughness of the deposited metal in electro-slag welding is attributable to the fact that the electro-slag welding process is different from other welding processes in the afore-described two aspects.

Also, it should be pointed out that the deposited metal in electro-slag welding contains less amounts of nitrogen and oxygen.

The aforementioned ranges of Mn and Si in the wire according to the invention are necessary in order to obtain adequate strength and ductility and excellent notch toughness for the deposited metal. The intended effects cannot be obtained if the Mn content is less than 0.3 percent. Increasing the Mn content above 2.5 percent, and the Si content above 1 percent, however, results in increased hardness and causes slight segregation, which tends to result in cracks.

Regarding the carbon content, the lower the carbon quantity, the better will be the notch toughness of the deposited metal. For practical purposes, the upper permissible limit is 0.25 percent. Above this limit, the impact value will be reduced and cracks will tend to result.

The boron content should be present in the form of a powdery alloy in the casing. As has been mentioned, the invention is based on the finding that the deposited metal will have excellent notch toughness if the wire contains proper quantities of carbon, manganese and silicon and a slight quantity of boron in electro-slag welding. Today, electroslag welding methods mostly use solid wires from the standpoint of ease of handling. In accordance with the invention, excellent effects may be obtained by using a composite wire consisting of a hollow casing and a powdery composition which fills the internal bore of the wire.

If the wire contains suitable quantities of carbon, manganese, and silicon, as well as boron, but is manufactured as a solid wire, cracks are very likely to result in the casting and rolling of the steel containing boron, so that productivity will decrease resulting in an increase in the price of the product. Productivity will be severely affected, even if the boron content is as slight as 0.001 to 0.05 percent.

If the wire is in composite form rather than solid form, a deposit metal of superior notch toughness will be obtained. Impact tests conducted on deposited metals produced in electro-slag welding of steels containing niobium with solid and composite wires of substantially the same chemical compositions have proven that with composite wires better impact values can be obtained more frequently. Using composite wires, the casing of the wire directly contacts the slag in the slag bath and is elevated to a high temperature. However, the powdery composition which is enclosed within, but is not integral with, the casing is at a comparatively low temperature when the wire reaches the bottom of the slag bath, since heat conduction from the casing to the inside powdery composition is inferior. Thus, as the casing fuses, the powdery composition will be introduced into the molten metal while it is at a comparatively low temperature. This means that the boron content in the powdery composition will be introduced into the molten metal while it is at a comparatively low temperature.

On the other hand, with a solid wire, unlike the composite wire, no powdery boron alloy is present and the boron is contained in the integral solid wire. Therefore, it is heated to high temperature immediatedly upon immersion of the wire in the slag and for a longer period. Since boron has a greater affinity for oxygen than for silicon, it is very prone to oxidation at high temperatures. Thus, the boron present in the slag bath at a high temperature for a longer time is very likely to be oxidized into boron oxide ($B_2O_3$). The melting point of $B_2O_3$ is about 450°C., which is extremely low as compared with the melting temperature of iron. The presence of boron oxide with the low melting temperature in the steel renders the steel fragile. Therefore, when the wire is a solid wire, the effects of the boron content will be cancelled by the formation of boron oxide. On the other hand, if a composite wire is used, the boron alloy will be mixed in powder inside casing, since it will have been held at a comparatively low temperature as mentioned earlier. It is believed that in the composite wire, therefore, the boron in the deposited steel will be oxidized to a much lesser extent. Accordingly, by using a composite wire, it is possible to obtain a deposited metal wherein the desired effect of boron surpasses the undesired effect of the boron oxide. Even with a composite wire, if it contains boron in its casing, results similar to those of the bare wire would be realized.

As has been mentioned, the wire should contain boron in the form of a powdery alloy of boron inside the hollow wire. Filling the boron alloy in the wire casing alone, however, is insufficient insofar as the content of boron is concerned. The boron content should be extremely slight, and if it exceeds 0.05 percent with respect to the total weight of the composite wire, including that content found in the wire casing, the deposited metal will be fragile and cracks are likely to appear. On the other hand, if too little boron is present, the intended effect will not be obtained. Accordingly, the boron should be present in an amount of at least 0.001 percent or more in the composite wire.

The particle size of the boron powder is somewhat important, since if the particle size is too large, fine segregation of the boron alloy or boron within the deposited metal can result and fine cracks can appear. If the content of boron in the boron alloy is excessive, boron oxide will be produced, so that segregation can result. Investigations conducted in this respect reveal that the boron content in the boron alloy should be 50 percent or less. Regarding the grain size, it is desirable that 60% of the particles be finer than 9 mesh from the standpoint of imparting desirable effects on the notch toughness of the deposited metal.

While excellent results can be obtained by adding the aforementioned elements to the electrode wire composition, similar results may also be obtained if the wire contains suitable proportions of these elements in combination with elements such as aluminum, titanium, zirconium, vanadium, chromium or molybdenum. The addition of any of these elements will have no adverse effects on the notch toughness of the deposited metal, and, in fact, will actually improve the notch toughness. However, the addition of excessive amounts of these elements will adversely affect the notch toughness and the ductility of the deposited metal, and will occasionally cause cracks to be formed in the deposited metal.

Experiments reveal that no undesirable effects will result if the total content of one or more of the members of the group, namely, Al, Ti, Zr or V, in the wire is present in amounts of 1 percent or less.

Nickel, chromium and molybdenum are quite effective for increasing the strength of the deposited metal. They can also slightly improve the notch toughness of the deposited metal. However, an excessive addition of these elements has the effect of merely increasing the strength of the deposited metal, and degrades the bending characteristics of the deposit.

Particularly, if nickel is excessively contained in the wire, segregation and cracking of the deposit can result. In this respect, the nickel content in the wire should desirably be 5 percent or less. The chromium content should desirably be 5 percent or less from the standpoint of strength of deposited metal. Molybdenum also leads to degradation of toughness and crack-proofing if it is added excessively. Its content preferably ranges between 0.1 and 1 percent.

The aforementioned elements other than boron may be incorporated in the form of alloys to the steel casing constituting the composite wire. Alternatively, they may be present in the powder fill in the form of such alloy materials as ferrosilicon, ferromolybdenum, ferromanganese or ferrotitanium. Such alloy materials may be enclosed within the casing either solely or as a mixture with a conventional flux, such as a slag agent. Thus, the aforementioned content ranges are related to the wire as a whole.

According to the invention, the powder to be filled in the casing may be of ordinary composition. For example, it may contain an iron powder, or alloy powder and a deoxidizing agent as well as a slag agent. For electro-slag welding, however, the lower the content of slag agent, the better will be the electrode wire. If a wire containing a large quantity of slag agent is used, the slag will build-up at the weld metal zone and the slag bath will become excessively deep, so that steady welding cannot be maintained and insufficient penetration will result. In this respect, according to the invention, it is desirable to use iron powder, alloy powder and deoxidizing agent, mainly, as the filler powder. Alternatively, the casing can be filled with boron alloy alone, without the use of any other powdery composition.

In accordance with this invention, the particular cross-sectional structure of the composite wire is not especially critical and it may be circular, polygonal or any other form as desired. A circular tube is usually made of hoop steel which is filled with powdery composition.

The proportion of the charged powder is desirably about 1.5 to 60 percent based on the total wire weight.

Having generally described the invention, a further understanding can be attained by reference to certain specific Examples which are provided herein for purposes of illustration only and are not intended to be limiting unless otherwise so specified.

EXAMPLE 1

A composite wire, having outer diameter of 2.4 mm., and having an overall chemical composition of 0.09 percent carbon, 1.85 percent manganese, 0.52 percent silicon and 0.008 percent boron was prepared. The boron was added in the form of a boron alloy containing 10 percent boron, 10 percent silicon, and the remainder iron. The powder had a particle size such that more than 90% was capable of passing through a 55 mesh screen. The particles were filled into a hoop steel casing.

The composite wire thus prepared was used in a consumption nozzle electro-slag welding of an I-type butt joint with a gap of 25 mm. thick, and containing niobium (with the chemical composition of the base metal being 0.16 percent carbon, 1.38 percent manganese, 0.31 percent silicon, 0.021 percent phosphorus and 0.018 percent sulfur).

Table 1 below lists various mechanical characteristics of the deposited metal without after-treatment.

TABLE 1

| Yield point in $kg/mm^2$ | Tensile strength in $kg/mm^2$ | Elongation in percent | Contraction of area in percent | Impact value at $-10°C$. with 2-V side notch in kg-m |
|---|---|---|---|---|
| 41.8 | 64.5 | 25 | 61 | 5.3 |

EXAMPLE 2

A composite wire having outer diameter of 2.4 mm., and having an overall chemical composition of 0.08 percent carbon, 1.92 percent manganese, 0.38 percent silicon, 0.13 percent titanium, and 0.009 percent boron was prepared. The boron was used in the form of a boron alloy containing 15 percent boron, 5 percent silicon, and the balance iron. The particles had a mesh size of more than 90 percent of 55 mesh passes. The particles were filled into a hoop steel casing.

The composite wire thus prepared was used in a consumption nozzle electro-slag welding of I-type butt joint with a gap distance of 25 mm. of high tensile steel plates 25 mm. thick. The base metal contained niobium and the base metal had a chemical composition of 0.16 percent carbon, 1.38 percent manganese, 0.31 percent silicon, 0.021 percent phosphorus and 0.018 percent sulfur.

Table 2 below lists various mechanical characteristics of the deposited metal, without after-treatment.

TABLE 2

| Yield point in kg/mm² | Tensile strength in kg/mm² | Elongation in percent | Contraction of area in percent | Impact value at −10°C. with 2-V side notch in kg-m |
|---|---|---|---|---|
| 40.2 | 63.8 | 26 | 62 | 5.8 |

EXAMPLE 3

A composite wire having outer diameter of 2.4 mm., and having an overall chemical composition of 0.08 percent carbon, 1.46 percent manganese, 0.03 percent silicon, 0.21 percent molybdenum, and 0.001 percent boron was prepared. The boron was used in the form of a ferroboron alloy containing 21 percent boron. The particle mesh size was 40% being capable of passing through a 68 mesh screen, 25% capable of passing through a 12 to 68 mesh screen, and 35% capable of passing through a 12 to 9 mesh screen. The particles were filled into a hoop steel casing.

The composite wire thus prepared was used in electro-slag welding of I-type butt joints with a gap of 18 mm. of 50 kg/mm² class high tensile steel plates 32 mm. thick.

The chemical composition of the base metal was 0.18 percent carbon, 1.35 percent manganese, 0.39 percent silicon, 0.016 percent phosphorus, and 0.022 percent sulfur.

Table 3 below lists the mechanical characteristics of the deposited metal without after-treatment.

TABLE 3

| Yield point in kg/mm² | Tensile strength in kg/mm² | Elongation in percent | Contraction of area in percent | Impact value at −10°C. with 2-V side notch in kg-m |
|---|---|---|---|---|
| 41.2 | 59.3 | 25 | 63 | 7.8 |

EXAMPLE 4

A composite wire having outer diameter of 2.4 mm., and having an overall chemical composition of 0.09 percent carbon, 1.85 percent manganese, 0.52 percent silicon, 0.18 percent titanium, 0.11 percent molybdenum, and 0.008 percent boron was prepared. The boron was in the form of a boron alloy containing 10 percent boron, 10 percent silicon, and the remainder iron. The particles had a mesh size of more than 90% passing through a 55 mesh screen. The particles were filled into a hoop steel casing.

The composite wire thus prepared was used in a consumption nozzle electro-slag welding of I-type butt joints with a gap of 25 mm. of SS41 steel plates 25 mm. thick. The chemical composition of the base metal was 0.17 percent carbon, 0.53 percent manganese, 0.21 percent silicon, 0.022 percent phosphorus, and 0.019 percent sulfur.

Table 4 below lists the mechanical characteristics of the deposited metal without after-treatment.

TABLE 4

| Yield point in kg/mm² | Tensile strength in kg/mm² | Elongation in percent | Contraction in percent | Impact value at −10°C. with 2-V side notch in kg-m |
|---|---|---|---|---|
| 39.2 | 57.2 | 27 | 64 | 6.8 |

EXAMPLE 5

A composite wire having outer diameter of 2.4 mm., and having an overall chemical composition of 0.08 percent carbon, 1.46 percent manganese, 0.06 percent silicon, 0.21 percent molybdenum, 0.003 percent boron, 0.01 percent titanium, and 1.4 percent nickel, was prepared. The boron content was in the form of a ferroboron containing 20 percent boron. The particles had a mesh size of 80% passing through a 68 mesh screen, 20% passing through 16 and 32 mesh screens. The particles were used to fill a hoop steel casing.

The composite wire thus prepared was used in a consumption nozzle electro-slag welding of I-type butt joints with a gap of 18 mm. of 50-kg/mm² class high tensile steel plates 32 mm. thick.

The chemical composition of the base metal was 0.18 percent carbon, 1.31 percent manganese, 0.32 percent silicon, 0.018 percent phosphorus, 0.022 percent sulfur, 0.02 percent niobium and 0.045 percent aluminum.

Table 5 lists the mechanical characteristics of the deposited metal without after-treatment.

TABLE 5

| Yield point in kg/mm² | Tensile strength in kg/mm² | Elongation in percent | Contraction of area in percent | Impact value at −10°C. with 2-V side notch in kg-m |
|---|---|---|---|---|
| 44.8 | 63.2 | 27 | 63 | 6.2 |

For comparison, the impact value at −10°C. of the deposited metal from a US-49 wire used in consumption nozzle electro-slag welding of usual 50-kilogram class high tension steel was 2.8 kg-m. It can therefore be recognized that, according to this invention, the impact value at −10°C. has been increased approximately twice or more as compared with the prior art.

EXAMPLE 6

A composite wire having outer diameter 2.4 mm., and having an overall chemical composition of 0.09 percent carbon, 1.85 percent manganese, 0.52 percent silicon, 0.008 percent boron and 0.30 percent aluminum, was prepared. The boron was used in the form of a boron alloy containing 10 percent boron, 10 percent silicon and the remainder being iron. The particle mesh size was more than 90% passing through a 55 mesh screen. The particles were used to fill a steel strip casing.

The composite wire thus prepared was used in a consumption nozzle electro-slag welding of I-type butt joints with a gap of 25 mm. thick. The base metal contained niobium and the base metal had a chemical composition of 0.16 percent carbon, 1.38 percent manganese, 0.31 percent silicon, 0.021 percent phosphorus and 0.019 percent sulfur.

Table 6 below lists various mechanical characteristics of the deposited metal without after-treatment.

TABLE 6

| Yield point in kg/mm² | Tensile strength in kg/mm² | Elongation in percent | Contraction of area in percent | Impact value at −10°C. with 2-V side notch in kg-m |
|---|---|---|---|---|
| 43.8 | 66.2 | 24 | 60 | 5.1 |

EXAMPLE 7

A composite wire having outer diameter of 2.4 mm., and having an overall chemical composition of 0.08 percent carbon, 1.92 percent manganese, 0.38 percent silicon, 0.09 percent vanadium, and 0.009 percent boron, was prepared. The boron was used in the form of a boron alloy containing 15 percent boron, 5 percent silicon, and the remainder being iron. The particle mesh size was more than 90% passing through a 55 mesh screen. The particles were used to fill a steel strip casing.

The composite wire thus prepared was used in a consumption nozzle electro-slag welding of I-type butt joint with a gap of 25 mm. of high tensile steel plates 25 mm. thick. The wire contained niobium and the base metal had a chemical composition of 0.16 percent carbon, 1.38 percent manganese, 0.31 percent silicon, 0.021 percent phosphorus, and 0.018 percent sulfur.

Table 7 below lists various mechanical characteristics of the deposited metal without after-treatment.

TABLE 7

| Yield point in kg/mm² | Tensile strength in kg/mm² | Elongation in percent | Contraction of area in percent | Impact value at −10°C. with 2-V side notch in kg-m |
|---|---|---|---|---|
| 40.1 | 62.7 | 25 | 61 | 5.4 |

EXAMPLE 8

A composition wire having outer diameter of 2.4 mm., and having an overall chemical composition of 0.08 percent carbon, 1.46 percent manganese, 0.03 percent silicon, 0.21 percent molybdenum, 2.3 percent chromium, and 0.01 percent boron, was prepared. The boron was used in the form of a ferroboron alloy containing 21 percent boron. The particles had a mesh size of 40 percent being capable of passing through a 68 mesh screen, 25 percent being capable of passing through 12 and 68 mesh screens, and 35% being capable of passing through 12 and 9 mesh screens. The particles were used to fill a steel strip casing.

The composite wire thus prepared was used in an electro-slag welding of I-type butt joints with a gap of 25 mm. of 50-kg/mm² class high tension steel plates 32 mm. thick.

The chemical composition of the base metal was 0.18 percent carbon, 1.36 percent manganese, 0.39 percent silicon, 0.016 percent phosphorus, and 0.022 percent sulfur.

Table 8 below lists the mechanical characteristics of the deposited metal without after-treatment.

TABLE 8

| Yield point in kg/mm² | Tensile strength in kg/mm² | Elongation in percent | Contraction of area in percent | Impact value at −10°C. with 2-V side notch in kg-m |
|---|---|---|---|---|
| 45.7 | 63.4 | 26 | 62 | 8.2 |

EXAMPLE 9

A composite wire having a wire diameter of 2.4 mm., and having an overall chemical composition of 0.09 percent carbon, 1.85 percent manganese, 0.52 percent silicon, 0.13 percent zirconium, 0.11 percent molybdenum, and 0.008 percent boron was prepared. The boron was used in the form of a boron alloy containing 10 percent boron, 10 percent silicon, and the remainder iron. The particle mesh size was more than 90 percent being capable of passing through a 55 mesh screen. The particles were used to fill a steep strip casing.

The composite wire thus prepared was used in the consumption nozzle electro-slag welding of I-type butt joints with a gap of 25 mm. of SS41 steel plates 25 mm. thick. Chemical composition of the base metal was 0.17 percent carbon, 0.53 percent manganese, 0.21 percent silicon, 0.022 percent phosphorus, and 0.019 percent sulfur.

Table 9 below lists the mechanical characteristics of the deposited metal without after-treatment.

TABLE 9

| Yield point in kg/mm² | Tensile strength in kg/mm² | Elongation in percent | Contraction of area in percent | Impact value at −10°C. with 2-V side notch in kg-m |
|---|---|---|---|---|
| 38.9 | 56.3 | 27 | 65 | 7.1 |

EXAMPLE 10

A composite wire having outer diameter of 2.4 mm., and having an overall chemical composition of 0.08 percent carbon, 1.46 percent manganese, 0.06 percent silicon, 0.21 percent molybdenum, 0.003 percent boron, 0.02 percent aluminum, and 1.4 percent nickel, was prepared. The boron was used in the form of a ferroboron alloy containing 20 percent boron. The particle mesh size was 80 percent capable of passing through a 68 mesh screen, 20% passing through a 16–32 mesh screen. The particles were used to fill a steel strip casing.

The composite wire thus prepared was used in a consumption nozzle electro-slag welding of I-type butt joints with a gap of 25 mm. of 50-kg/mm² class high tensile steel plates 32 mm. thick.

The chemical composition of the base metal was 0.18 percent carbon, 1.31 percent manganese, 0.32 percent silicon, 0.018 percent phosphorus, 0.022 percent sulfur, 0.02 percent niobium and 0.045 percent aluminum.

Table 10 lists the mechanical characteristics of the deposited metal without after-treatment.

TABLE 10

| Yield point in kg/mm² | Tensile strength in kg/mm² | Elongation in percent | Contraction of area in percent | Impact value at −10°C. with 2-V side notch in kg-m |
|---|---|---|---|---|
| 45.1 | 62.9 | 26 | 63 | 7.1 |

In comparison to the above examples, the impact value at −10°C. of the deposited metal of the US-49 wire used in the consumption nozzle electro-slag welding of the usual 50-kg/mm² class high tensile steel was 2.8 kg-m.

As has been shown in the foregoing, incorporation of boron or boron and titanium or aluminum, zirconium, vanadium, chromium or nickel, etc., in addition to boron to the wire for electro-shag welding is effective in greatly improving the notch brittleness character of the deposited metal, without after-treatment.

Having now fully described the invention, it will be apparent to one of ordinary skill in the art that many modifications and variations can be made thereto without departing from the spirit or scope of the invention.

Accordingly, what is claimed as new and intended to be covered by Letters Patent is:

1. In an electro-slag welding process, the improvement comprising:
   using a composite electrode wire comprising a steel casing and a powdered composition fill within said casing, said composite electrode wire consisting essentially of up to 0.25% carbon. 0.3 to 2.5% manganese, up to 1% silicon, 0.001 − 0.05% boron with respect to the total weight of said composite electrode wire and the balance iron, the boron content being present within said casing, in powdered form, as a boron alloy containing up to 50% boron.

2. In an electro-slag welding process, the improvement comprising:
   using a composite electrode wire comprising a steel casing and a powdered composition fill within said casing, said composite electrode wire consisting essentially of up to 0.25% carbon, 0.3 to 2.5% manganese, up to 1% silicon, 0.001 − 0.05% boron, up to 1% of at least one member selected from the group consisting of titanium, aluminum, zirconium and vanadium with respect to the total weight of said composite electrode wire and the balance iron, the boron content being present within said casing, in powdered form, as a boron alloy containing up to 50% boron.

3. In an electro-slag welding process, the improvement comprising:
   using a composite electrode wire comprising a steel casing and a powdered composition fill within said casing, said composite electrode wire consisting essentially of up to 0.25% carbon, 0.3 to 2.5% manganese, up to 1% silicon,, 0.001 − 0.05% boron, and at least one member selected from the group consisting of 0.1 to 1% molybdenum, up to 5% chromium and up to 5% nickel, with respect to the total weight of said composite electrode wire and the balance essentially iron, the boron content being present within said casing, in powdered form, as a boron alloy containing up to 50% boron.

4. In an electro-slag welding process, the improvement comprising:
   using a composite electrode wire comprising a steel casing and a powdered composition fill within said casing, said composite electrode wire consisting essentially of up to 0.25% carbon, 0.3 to 2.5% manganese, up to 1% silicon, 0.001 − 0.05% boron, up to 1% of at least one member selected from the group consisting of titanium, aluminum, zirconium and vanadium and at least one member selected from the group consisting of 0.1 to 1% molybdenum, up to 5% chromium, and up to 5% nickel, with respect to the total weight of said composite electrode wire and the balance iron, the boron content being present within said casing, in powdered form, as a boron alloy containing up to 50% boron.

5. The method of claim 1, wherein at least 60% of said powdered boron alloy has a particle size of less than 9 mesh in grain size.

6. The method of claim 2, wherein at least 60% of said powdered boron alloy has a particle size of less than 9 mesh in grain size.

7. The method of claim 3, wherein at least 60% of said powdered boron alloy has a particle size of less than 9 mesh in grain size.

8. The method of claim 4, wherein at least 60% of said powdered boron alloy has a particle size of less than 9 mesh in grain size.

* * * * *